(12) United States Patent
Chung et al.

(10) Patent No.: US 12,079,853 B2
(45) Date of Patent: Sep. 3, 2024

(54) APPARATUS AND METHOD FOR RECOMMENDING MUSIC CONTENT BASED ON MUSIC AGE

(71) Applicant: Kakao Entertainment Corp., Seongnam-si (KR)

(72) Inventors: Ji Hoon Chung, Seoul (KR); Byung Hwa Yun, Yongin-si (KR)

(73) Assignee: KAKAO ENTERTAINMENT CORP., Gyeonggi-Do (KR)

( * ) Notice: Subject to any disclaimer, the term of this patent is extended or adjusted under 35 U.S.C. 154(b) by 616 days.

(21) Appl. No.: 16/741,757

(22) Filed: Jan. 14, 2020

(65) Prior Publication Data

US 2020/0226662 A1 Jul. 16, 2020

(30) Foreign Application Priority Data

Jan. 16, 2019 (KR) .................. 10-2019-0005721

(51) Int. Cl.
| | | |
|---|---|---|
| *G06F 16/00* | (2019.01) | |
| *G06F 7/00* | (2006.01) | |
| *G06F 16/635* | (2019.01) | |
| *G06F 16/638* | (2019.01) | |
| *G06F 16/65* | (2019.01) | |
| *G06F 16/683* | (2019.01) | |
| *G06Q 30/0601* | (2023.01) | |

(52) U.S. Cl.
CPC ....... *G06Q 30/0631* (2013.01); *G06F 16/637* (2019.01); *G06F 16/639* (2019.01); *G06F 16/65* (2019.01); *G06F 16/683* (2019.01)

(58) Field of Classification Search
CPC ...... G06F 16/637; G06F 16/65; G06F 16/683; G06F 16/639; G06Q 30/0631

USPC ........................................................ 707/734
See application file for complete search history.

(56) References Cited

U.S. PATENT DOCUMENTS

| | | | | |
|---|---|---|---|---|
| 2007/0276870 | A1* | 11/2007 | Rosenberg | G06F 16/40 |
| 2018/0137421 | A1* | 5/2018 | Takeda | G06F 16/337 |
| 2018/0367229 | A1* | 12/2018 | Gibson | H04H 60/31 |
| 2019/0034423 | A1* | 1/2019 | Aravamudan | G06F 16/337 |
| 2019/0066231 | A1* | 2/2019 | Dixit | G06Q 50/01 |
| 2019/0155840 | A1* | 5/2019 | O'Konski | G06F 16/636 |
| 2019/0236450 | A1* | 8/2019 | Li | G06N 3/045 |

FOREIGN PATENT DOCUMENTS

| | | |
|---|---|---|
| JP | 2011134199 A | 7/2011 |
| KR | 1020110043369 A | 4/2011 |
| KR | 101051804 B1 | 7/2011 |
| KR | 1020150000952 A | 1/2015 |

* cited by examiner

*Primary Examiner* — Raquel Perez-Arroyo
(74) *Attorney, Agent, or Firm* — CANTOR COLBURN LLP

(57) ABSTRACT

A method for recommending music content is provided. The method includes obtaining account information about an account of a service which provides music content, obtaining content information associated with properties of music content consumed in response to the account information and usability information about a manner which uses the music content in response to the account information, based on the account information, estimating a music age corresponding to the account information, based on the account information, the content information, and the usability information, and recommending music content based on the music age.

12 Claims, 4 Drawing Sheets

APPARATUS AND METHOD FOR RECOMMENDING MUSIC CONTENT BASED ON MUSIC AGE

CROSS-REFERENCE TO RELATED APPLICATION(S)

This application claims the benefit of Korean Patent Application No. 10-2019-0005721 filed on Jan. 16, 2019, in the Korean Intellectual Property Office, the disclosure of which is incorporated herein by reference.

BACKGROUND

1. Field of the Invention

Example embodiments relate to a method and apparatus for recommending music content based on a music age.

2. Description of the Related Art

It is common that a music source service provides a service and marketing suitably determined based on an age of a user when the user purchases a pass. However, for example, a user in 40s may like music of an idol singer or a user in 10s may like classic music or Korean classical music. As such, musical tastes of users are very various for each individual.

Thus, when a musical taste of the user differs from that of a surrounding peer group, uniformly classifying musical tastes of the user depending on gender, a biological age, and the like does not become a suitable classification standard. Furthermore, it is difficult to satisfy the user using a music source service provided according to an inappropriate classification standard.

SUMMARY

According to an aspect, there is provided a method for recommending music content including obtaining account information about an account of a service which provides music content, obtaining content information associated with properties of music content consumed in response to the account information and usability information about a manner which uses the music content in response to the account information, based on the account information, estimating a music age corresponding to the account information, based on the account information, the content information, and the usability information, and recommending the music content based on the music age.

The estimating of the music age corresponding to the account information may include identifying a spending pattern of the music content corresponding to the account information, based on the account information, the content information, and the usability information and estimating the music age corresponding to the account information, based on the spending pattern.

The identifying of the spending pattern may include generating a first vector based on the account information, generating a second vector based on the content information previously collected in response to the account information, generating a third vector based on the usability information previously collected in response to the account information, and generating a vector corresponding to the spending pattern, based on the first vector, the second vector, and the third vector.

At least one of the first vector, the second vector, and the third vector may include a plurality of elements corresponding to a plurality of entities. The generating of the first vector, the second vector, and the third vector may include determining values of the plurality of elements based on a history previously collected in response to the plurality of entities.

The estimating of the music age may include determining probabilities to correspond to a plurality of music age candidates, each with the predetermined account information, based on a vector corresponding to the spending pattern and selecting any one of the plurality of music age candidates based on the probabilities.

The estimating of the music age may include applying a first weight corresponding to the account information, a second weight corresponding to the content information, and a third weight corresponding to the usability information, for every a plurality of predetermined music age candidates, determining probabilities corresponding to the plurality of music age candidates, based on the weights for every music age candidates, and estimating the music age corresponding to the account information, based on the probabilities.

The identifying of the spending pattern may include identifying a spending pattern for each time zone of the music content corresponding to the account information, based on a time when the music content is consumed, the time being included in the usability information.

The account information may include at least one of personal information stored in the account, purchase information of a pass through the account, and participation information of a promotion through the account.

The promotion may include at least one of a pass discount event for the music content, an album release event corresponding to the music content, a performance event corresponding to the music content, an affiliate event associated with the music content.

The properties of the music content may include at least one of a title of the music content, a genre of the music content, an artist of the music content, a lyric writer of the music content, a composer of the music content, a management company of the artist, a type of the artist, sound quality of the music content, popularity of the music content, and a type of the music content.

The usability information may include at least one of a history of using a service menu associated with the music content, a type of a point of contact (POC) used to access the music content, and a manner which consumes the music content.

The type of the POC may include at least one of a mobile dedicated app, a tablet dedicated app, a window dedicated app, a Mac dedicated app, a social network service (SNS) dedicated app, a navigation dedicated app, a vehicle dedicated app, and an artificial intelligence (AI) speaker dedicated app.

The manner which consumes the music content may include at least one of whether to repeatedly set the same music content, consumption of music content by a recommended playlist, and consumption of music content by a playlist directly edited by a user.

The manner which consumes the music content may include at least one of a 1-day viewing time and a use time zone.

The obtaining of the account information may include estimating personal information corresponding to the account, based on at least one of whether identity authentication associated with the account is performed and whether there is parental consent associated with the account.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
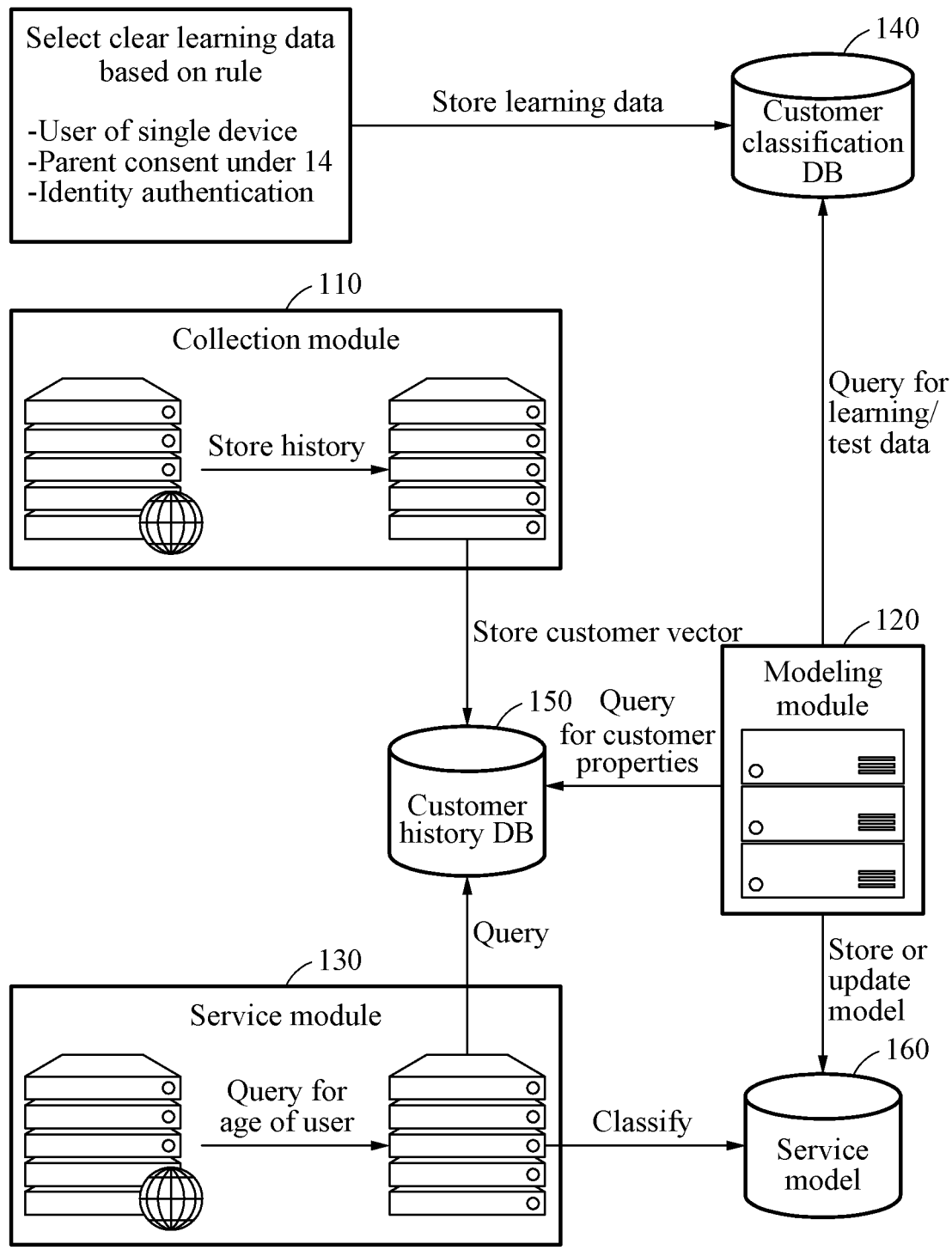
FIG. 1 is a drawing illustrating a configuration and operation of a server for recommending music content based on a music age according to an embodiment.

Hereinafter, embodiments are described in detail with reference to the accompanying drawings. With respect to the descriptions of the drawings, like reference numerals refer to like elements. Various modifications are possible in various embodiments described below. Embodiments described below are not intended to be limited to the implementation forms, and it is understood that it should include all modifications, equivalents, and/or alternatives according to various embodiments.

The terminology used herein is used to describe specified embodiments and is not intended to limit the embodiments. The expression of singular number includes the expression of plural number unless clearly intending otherwise in a context. In the specification, it should be understood that terms of 'comprise', 'have', and the like are to designate the existence of a feature disclosed in the specification, a numeral, a step, an input, a constituent element, a part, or a combination thereof, and do not previously exclude a possibility of existence or supplement of one or more other features, numerals, steps, inputs, constituent elements, parts, or combinations thereof.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the inventive concept.

Furthermore, in describing embodiments with reference to the accompanying drawings, the same reference denotations are assigned to the same elements without regard to the drawing denotations, a duplicated description thereof will be omitted. When it is determined that a detailed description of the related well-known technology unnecessarily blurs the gist of embodiments in describing embodiments, a detailed description thereof will be omitted.

FIG. 1 is a drawing illustrating a configuration and operation of a server for recommending music content based on a music age according to an embodiment. According to embodiments to be described below, the server may estimate a music age of a user based on a variety of information. Herein, the 'music age' may be the concept of being distinguished from a rear age of a user corresponding to an account of a service which provides music content and may be understood as a virtual age matched with a spending pattern of music content of the user. For example, the server may estimate a music age using a variety of information, for example, an age of a user registered with an account, properties of music content provided through the account, and a usage time of a service through the account, and service records.

When simply recommending music content using age information registered with an account or histories of content played through the account, it is unable to meet real needs of various users. According to embodiments to be described below, needs of various users may be satisfied in a broad and detailed manner by using a variety of information for estimating a music age of a specific user in an overall manner and providing a service which suits the estimated music age.

Referring to FIG. 1, a server 100 for recommending music content according to an embodiment may include a collection module 110, a modeling module 120, a service module 130, a customer classification database (DB) 140, a customer history DB 150, and a service model 160. Each module may be included in one or more server devices, and each DB may be included in one or more DB devices. Each module and each DB may connect and interwork with each other in a wired or wireless manner.

The collection module 110 may collect and store various customer histories, for example, a history of streaming music content consumed in response to account information, a history of downloading the music content, a history of visiting a page of a service application which provides the music content, a history of selecting 'like' for specific music content, a history of join as fan for an artist of the specific music content, and a history of searching for the specific music content. The collection module 110 may convert a customer history into a vector form (e.g., 'customer vector'). The collection module 110 may store the customer history (the customer vector) converted into the vector form in the customer history DB 150.

The modeling module 120 may query for learning data and evaluation data (or ground truth data) stored in the customer classification DB 140 and may train a service model (e.g., a neural network or the like) using the found data.

The customer classification DB 140 may include learning data for estimating a music age corresponding to account information based on a rule and/or ground truth data corresponding to the learning data. The customer classification DB 140 may include various data used to learn a neural network included in the modeling module 120. The ground truth data may correspond to, for example, the result of recruit a reference group for each real age group by a certain volume or more and analyzing spending patterns of users for music content. The modeling module 120 may estimate or predict music ages of all users based on a spending pattern of the reference group. The music age may be, for example, an age classified by dividing music source spending patterns of a corresponding user for each taste among music source (or music content) spending patterns for every a plurality of age groups.

The customer classification DB 140 may include account information associated with an account of a service which provides music content. The account information may include, for example, personal information stored in an account, purchase information of a pass through the account, participation information of a promotion through the account, and the like. In this case, the personal information may be estimated by the server 100 based on whether identity authentication associated with the account is performed and when there is parental consent associated with the account. When it is determined that the identity authentication (e.g., adult authentication) associated with the account is completed, the server 100 may estimate that a user corresponding to the account is over 19 years old. Alternatively, when it is determined that there is the parental consent associated with the account, the server 100 may estimate that the user associated with the account is under 14 years old.

The modeling module 120 may query for customer properties stored in the customer history DB 150. Herein, other than account information about an account of a service which provides music content, the customer properties may include, for example, content information associated with properties of music content consumed in response to the account information and usability information about a manner which uses the music content in response to the account information.

The modeling module 120 may apply the found customer properties to a previously trained service model to estimate a music age corresponding to the account information and recommend music content. In this case, the modeling module 120 may include a service model 160 for estimating a music age corresponding to the account information and recommending music content based on the music age. The service model 160 may be a learning-based model, for example, a neural network. The service model 160 may be included in the modeling module 120 and, as shown in FIG. 1, may be separated from the modeling module 120.

The service module 130 may query for a real age of the user through a service and/or marketing channel and may extract customer properties from behavior information of a customer. The service module 130 may query the customer history DB 150 based on the extracted customer properties. The service module 130 may classify the extracted customer properties using, for example, a classifier and may query the classified customer properties in the service model 160.

The server 100 according to an embodiment may analyze the account information, the content information, and the usability information, collected by the collection module 110, in an overall manner and may estimate a music age matched with the result of the analysis using the service model 160. The server 100 may recommend the music content based on the estimated music age, rather than a real age of the user, registered as personal information, to recommend and/or provide the music content capable of satisfying the user who has a different music taste from surrounding peer groups.

Figure 2:
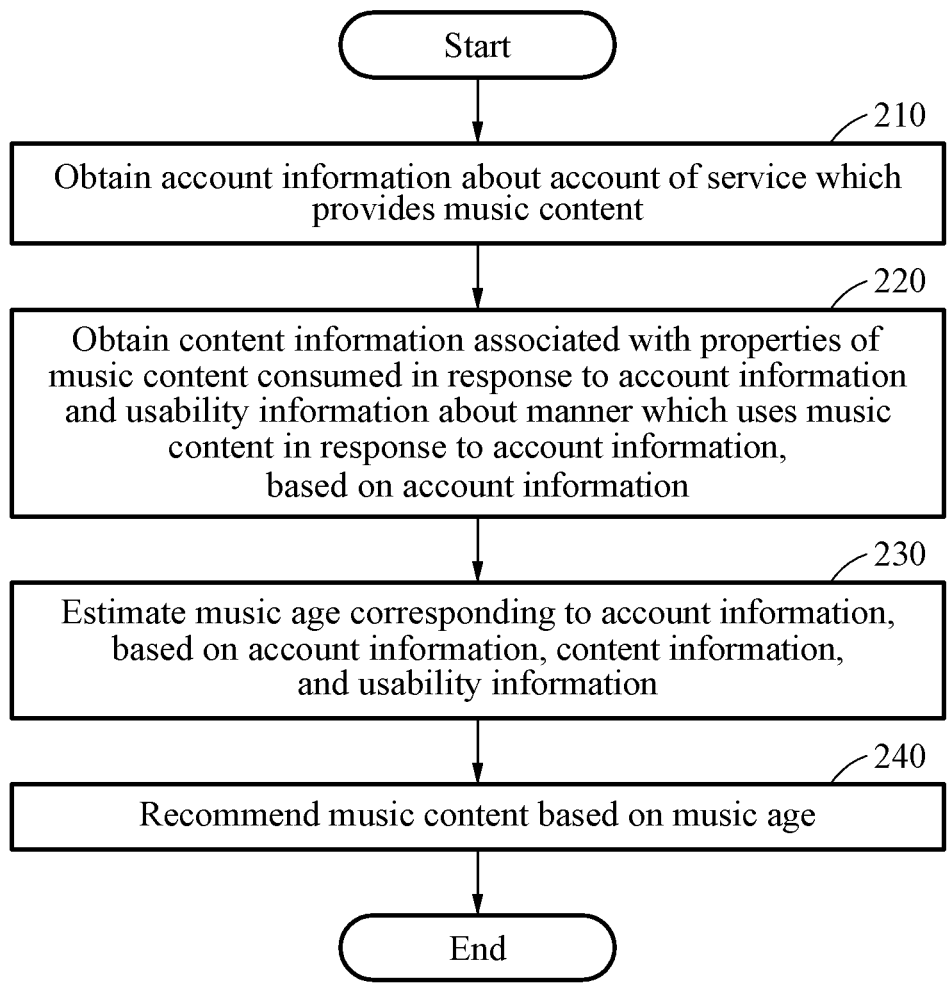
FIG. 2 is a flowchart illustrating a method for recommending music content according to an embodiment.

FIG. 2 is a flowchart illustrating a method for recommending music content according to an embodiment. Referring to FIG. 2, in operation 210, a server according to an embodiment may obtain account information about an account of a service which provides music content.

In operation 220, the server may obtain content information associated with properties of the music content consumed in response to the account information and usability information about a manner which uses the music content in response to the account information, based on the account information obtained in operation 210.

Herein, the account information may be information about the account of the service which provides the music content and may include various entities other than an entity for personal information stored in the account. For example, the account information may further include a purchase pass entity corresponding to purchase information of a pass through the account and a participation promotion entity indicating participation information of a promotion through the account.

The content information may include information associated with the properties of the music content consumed in response to the account information. The properties of the music content may include, for example, a title of the music content, a genre of the music content, an artist of the music content, a composer of the music content, a lyric writer of the music content, a management company of the artist, a type of the artist, sound quality of the music content, popularity of the music content, a type of the music content.

The usability information may be information about the manner which uses the music content in response to the account information. The usability information may include entities, for example, a history ('service menu') of using a service menu associated with the music content, a type of a point of contact (POC) ('access POC') used to access the music content, and a manner ('other usability') which consumes the music content. The manner which consumes the music content may include a time when the music content is consumed (e.g., a use time zone, a 1-day viewing time, or the like) or a play mode of the music content (e.g., whether to use a playlist, whether to repeat the same song, or the like).

A description will be given below of detailed examples of the account information, the content information, and the usability information with reference to FIG. 3.

In operation 230, the server may estimate a music age corresponding to the account information based on the account information, the content information, and the usability information. The server may determine a spending pattern of the music content corresponding to the account information, based on the account information, the content information, and the usability information.

The spending pattern according to an embodiment may include a pattern in which account information, content information, and usability information of a user is considered in an overall manner, rather than a simple pattern about whether the user consumes any music content. To this end, embodiments may provide a function of recognizing a complex pattern incapable of being estimated through an existing general pattern recognition technology and may provide a suitable service depending on the recognized result. For example, a complex overall pattern various users may have in various manners, for example, a pattern in which a child uses an account in the name of the parent or a pattern in which content or usability is varied for each time zone, as well as a pattern in which a user has a musical taste different from his or her rear age zone, may be recognized.

In detail, the pattern in which the content is varied for each time zone may be generated, for example, when user A (a non-working wife) uses corresponding account information in the day and when user B (a husband) who works for a company shares the account information in the morning and at night, although they use a single account.

Alternatively, the pattern in which the usability is varied for each time zone may be generated, for example, when a user usually consumes quiet music through a smart speaker at home and mainly consumes exiting music using a mobile terminal at peak times, although using single account information. In other words, a consumed music pattern may be varied according to a space where content is consumed, although a single account is used.

The server may estimate a music age corresponding to the account information, based on the spending pattern. The server may determine, for example, a spending pattern of the music pattern corresponding to the account information using a previously learned service model (e.g., a neural network, a random forest, or the like), based on the account information, the content information, and the usability information. In addition, the service model may be implemented in various forms. As an example, the service model may include a linear regression model. In this case, the server may identify a spending pattern of the music content corresponding to the account information using a predetermined linear function (e.g., $F=Ax+By+Cz$ or $f(x, y, z)$, where a, b, and c are weights, and where X, Y, and Z are account information, content information, and usability information, respectively), based on the account information, the content information, and the usability information.

As an example, information about a time when music content is consumed in the usability information may be reflected in probabilities for estimating a spending pattern for each time zone and/or a music age of the music content corresponding to the account information. For example, when a time when the music content is consumed is mainly 11 p.m. to 1 a.m., the server may determine the spending for each time zone as a late-night spending type. The server may consider that users in 20s and 30s mainly consume music content in a late-night time zone to increase a probability of estimating a music age corresponding to a corresponding account as 20s and 30s. Alternatively, when the time when the music content is consumed is 5 a.m. to 7 a.m., the server may determine the spending pattern for each time zone as a dawn spending type. The server may consider that users in 60s or 70s mainly consume music content in a dawn time zone to increase a probability of estimating a music age corresponding to a corresponding account as 60s or 70s. A description will be given in detail of the method for identifying the spending pattern of the music content corresponding to the account information and estimating the music age based on the spending pattern with reference to FIG. 4.

In operation 240, the server may recommend music content based on the estimated music age. Herein, the 'music content' may be understood as including a variety of multimedia content combined with a music source, for example, the music source, a music video including the music source, and a video combined with the music source. For convenience of description, the embodiment for recommending the music content is described, but various services based on a music age may be provided. For example, a service for providing a notification that a music age of a specific user corresponds to any generation may be provided.

Figure 3:
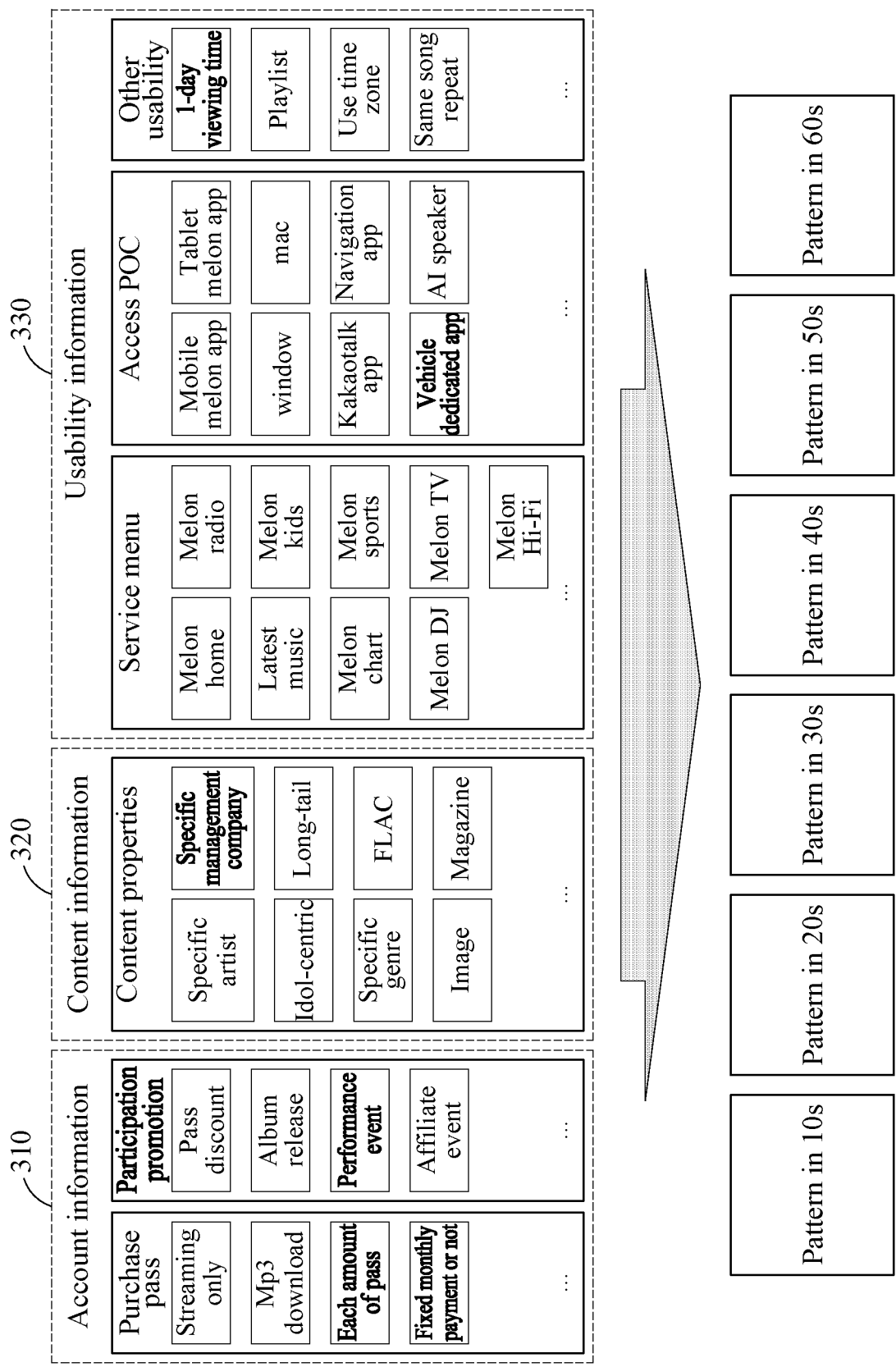
FIG. 3 is a drawing illustrating respective entities of account information, content information, and usability information and elements corresponding to the respective entities according to an embodiment.

FIG. 3 is a drawing illustrating respective entities of account information, content information, and usability information and elements corresponding to the respective entities according to an embodiment. Referring to FIG. 3, according to an embodiment, account information 310, content information 320, and usability information 330, which are stored in a DB, are shown.

In an embodiment, to more accurately analyze a spending pattern of music content, as shown in FIG. 3, a variety of information 310, 320, and 330 may be used in an overall manner.

The account information 310 may be information about an account of a service which provides music content and may include, for example, various entities other than an entity for personal information stored in an account. The account information 310 may further include a purchase pass entity corresponding to purchase information of a pass through an account and a participation promotion entity indicating participation information of a promotion through the account, as shown in FIG. 3. Furthermore, each entity may include a plurality of elements.

Although not illustrated in FIG. 3, the personal information entity may include elements such as a name, an age, and a gender of a user. The purchase pass entity may include elements such as a pass for streaming only, a pass for mp3 download, a complex pass including streaming and mp3 download, a pass for free lossless audio codec (FLAC), a pass for unlimited listening, a listening pass, a pass for downloading a separate song, a pass for downloading a music video, a pass for language only, each amount of pass, and fixed monthly payment or not.

The participation promotion entity may include elements, for example, a pass discount event for music content, an album release event corresponding to the music content, a performance event corresponding to the music content, and an affiliate event associated with the music content. The participation promotion entity may be classified as a periodic event or an aperiodic event. The periodic event may be an event where a time or date is determined, for example, a birthday pass discount event of an account user. The aperiodic event may be an event in which it is unable to specify a time or date, for example, a one million subscriber event or an album release event.

For example, there may be an event or promotion, a participation level of which is high according to an age of a user among various entities (the pass discount event, the album release event, the performance event, and the affiliate event) of participation promotion. Thus, a server may identify a participation level for each entity of such a promotion (e.g., whether a user participates in the promotion, the number of times that the user participates in the promotion, or the like) and may estimate a music age corresponding to account information.

The content information 320 may include information associated with properties of music content consumed in response to account information. The content information 320 may include a properties entity of music content ('content properties entity'). The content properties entity may include, for example, a title of the music content, a genre of the music content, an artist of the music content, a composer of the music content, a lyric writer of the music content, a producer of the music content, a management company of the artist, a type of the artist, sound quality of the music content, popularity of the music content, a type of the music content, and the like.

The genre of the music content may include, for example, a ballad, a rock, jazz, pop music, trot, classic music, Korean classical music, or the like. The type of the artist may include, for example, an idol, a senior singer, a famous singer, an obscure signer, a new singer, or the like. The sound quality of the music content may be classified according to whether there is a loss according to a compression rate, for example, AAC+, AAC 128K, MP3 320K, AAC 320K, FALC 16 bit, or the like. The popularity of the music content may include, for example, long-tail content, steady selling content, recent popular content, or the like. The type of the music content may include, for example, image content, magazine content, or the like.

The usability information 330 may include information about a manner which uses music content in response to account information. The usability information 330 may include entities, for example, a history ('service menu') of using a service menu associated with the music content, a type of POC ('access POC') used to access the music content, a manner ('other usability') which consumes the music content, and the like.

The service menu entity may include elements, for example, Melon home, Melon radio, latest music, Melon kids, Melon chart, Melon sports, Melon DJ, Melon TV, Melon Hi-Fi, and the like. For example, a main consumption group of Melon kids may be children and the youth (teenager). A main consumption group of Melon sports may be young adults and middle-aged men (20s to 50s). A main consumption group of Melon TV may be young adults and middle-aged women (20s to 50s). Thus, the server may identify an age which spends music content, based on such a service menu.

The access POC entity may include elements, for example, a mobile dedicated app (e.g., 'mobile Melon app'), a tablet dedicated app (e.g., 'tablet Melon app'), a window dedicated app, a Mac dedicated app, a social network service (SNS) dedicated app ('Kakaotalk app'), a navigation dedicated app, a vehicle dedicated app, an artificial intelligence (AI) speaker dedicated app, and the like.

The other usability entity may include elements, for example, whether the same music content is repeatedly set ('same song repeat') and a playlist (e.g., consumption of music content by a recommended playlist, consumption of music content by a playlist directly edited by a user, and the like) other than elements indicating a time when music content is consumed, such as, a 1-day viewing time and a use time zone.

The server according to an embodiment may identify the account information 310, the content information 320, and the usability information 330 in an overall manner and may estimate whether a spending pattern of music content corresponding to the account information 310 belongs to any of a plurality of patterns (e.g., a pattern in 10s, a pattern in 20s, a pattern in 30s, a pattern in 40s, a pattern in 50s, and a pattern in 60s). The server may estimate a music age corresponding to account information, based on the spending pattern. For example, a spending pattern in 10s may be a combination such as "Melon chart (latest chart)"+"idol-centric"+"pass discount"+"pass for streaming only"+"mobile dedicated app". Alternatively, for example, a spending pattern in 30s may be a combination such as "Melon chart"+"playlist (specific genre)"+"pass for fixed monthly payment"+"promotion participation X (No)"+"mobile Mac dedicated app". Thus, the server may estimate a music age corresponding to account information like Table 1 below depending on whether a spending pattern of music content corresponds to any combination in the spending pattern in 10s or the spending pattern in 30s, irrespective of a real age of a user corresponding to an account.

TABLE 1

| Account | Real age of user | Music age |
|---------|------------------|-----------|
| 0001 | 40 s | 40 s |
| 0002 | 20 s | 30 s |
| 0003 | 50 s | 10 s |
| 0004 | 20 s | 20 s |

Figure 4:
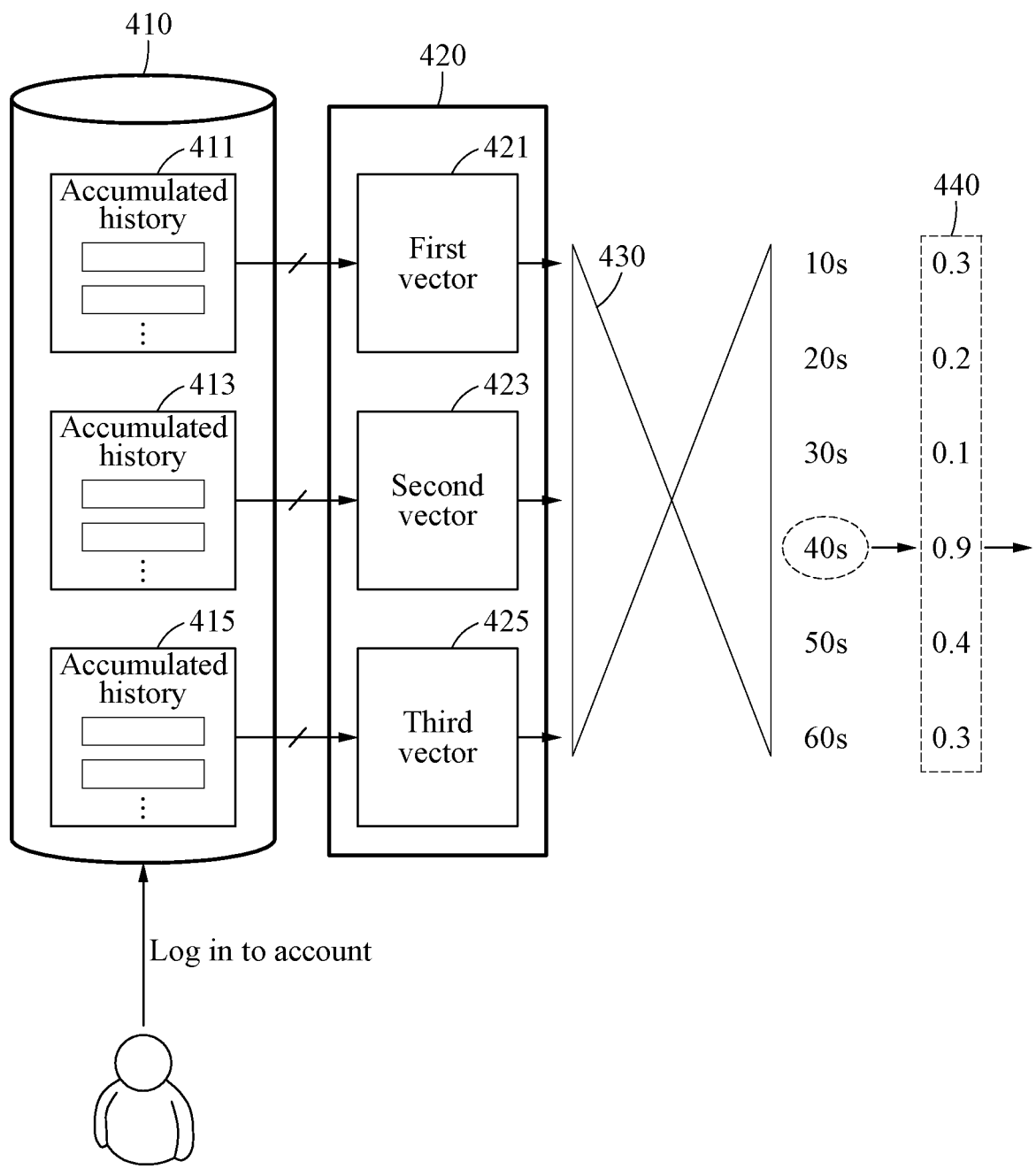
FIG. 4 is a drawing illustrating a method for recommending a music age corresponding to account information based on a spending pattern of music content according to an embodiment.

FIG. 4 is a drawing illustrating a method for recommending a music age corresponding to account information based on a spending pattern of music content according to an embodiment. Referring to FIG. 4, a DB 410, a customer vector 420 corresponding to a spending pattern of music content, a neural network 430, and probabilities 440 to correspond to a plurality of music age candidates, each with predetermined account information, are shown.

The DB 410 may store, for example, account information 411, content information 413, and usability information 415. The customer vector 420 may include a first vector 421 based on the account information 411, a second vector 423 based on the content information 413 previously collected in response to the account information 411, and a third vector 425 based on the usability information 415 previously collected in response to the account information 411. The neural network 430 may have various forms, for example, a deep neural network, a convolutional neural network, a recurrent neural network, and the like.

For example, it is assumed that 25-year-old user A logs in to account X of a service which provides music content. In this case, a description will be given below of a method where a server identifies a spending pattern of music content corresponding to account X. The server may generate the first vector 421 based on the account information 411 of user A, stored in the DB 410. The first vector 421 may include a plurality of elements corresponding to a plurality of entities included in the account information 411. The server may determine, for example, values of a plurality of elements included in account information 310 shown in FIG. 3, based on a previously collected history ('accumulated history') in response to a plurality of entities (e.g., a purchase pass entity, a participation promotion entity, and the like) included in the account information 310.

The server may generate the second vector 423 based on the content information 413 previously collected in response to the account information 411 stored in the DB 410. The second vector 423 may include a plurality of elements corresponding to an entity included in the content information 413. The server may determine values of a plurality of elements included in content information 320 shown in FIG. 3, based on a history previously collected in response to an entity (e.g., content properties) included in the content information 320.

Furthermore, the server may generate the third vector 425 based on the usability information 415 previously collected in response to the account information 411. The third vector 425 may include a plurality of elements corresponding to a plurality entities included in the usability information 415. The server may determine values of a plurality of elements included in usability information 330 shown in FIG. 3, based on a history previously collected in response to a plurality of entities (e.g., a service menu, access POC, the other usability, or the like) included in the usability information 330.

The server may generate the customer vector 420 corresponding to a spending pattern, based on the first vector 421, the second vector 423, and the third vector 425.

The server may input the customer vector 420 corresponding to the spending pattern to the neural network 430 and may select any one of a plurality of music age candidates, thus estimating a music age corresponding to the account information 411.

The neural network 430 may determine the probabilities 440 (e.g., 0.3 in 10s, 0.2 in 20s, 0.1 in 30s, 0.9 in 40s, 0.4 in 50s, and 0.3 in 60s) to correspond to the plurality of music age candidates, each with predetermined account information, based on the customer vector 420 corresponding to the spending pattern. The neural network 430 may select any one of the plurality of music age candidates based on the probabilities 440. The neural network 430 may estimate a music age candidate (40s) corresponding to the highest probability (0.9) as a music age corresponding to account information of account X.

Irrespective of a real age (25 years old) of user A, the server may recommend music content in which a musical taste of user A is reflected, based on the music age (40s) selected by the neural network 430.

Alternatively, according to an embodiment, the server may apply a first weight corresponding to account information, a second weight corresponding to content information, and a third weight corresponding to usability information, for every a plurality of predetermined music age candidates. The server may determine probabilities corresponding to the plurality of music age candidates, based on weights for every music age candidates. The server may estimate a music age corresponding to the account information, based on the probabilities.

Although not illustrated in the drawing, a service model may be implemented as a structure of a random forest. The random forest may include a plurality of decision trees, and each of the plurality of decision trees may determine parameters (e.g., weights) for estimating a music age based on accumulated histories. Probabilities of music age candidates may be determined through a combination of the determined parameters (e.g., a statistical combination), and a music age candidate with the highest probability may be estimated as a music age of a corresponding user.

Although not illustrated in the drawing, the server according to an embodiment may include one or more processors and a display. The server may include a plurality of parallel processors. The server may further include a memory. The one or more processors, the display, and the memory may be connected to each other via a communication bus. The server may be, for example, a single server, a cloud server, or a server which performs the same or similar function to the single server and a cloud server.

The one or more processors may perform at least one method described above with reference to FIGS. 1 to 4 or an algorithm corresponding to the at least one method. The one or more processors may execute program(s) and may control the server. A program code executed by the one or more processors may be stored in the memory.

Embodiments described above may be implemented with a hardware component, a software component, and a combination thereof. The methods according to the embodiments may be recorded in non-transitory computer-readable media including program instructions to implement various operations embodied by a computer. The described hardware devices may be configured to act as one or more software modules to perform the input operations of the embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for recommending music content by a server including a modeling module, a collection module, and a service module, the method comprising:
    training, by the modeling module, a service model using training data and result data stored in a customer database for determining a spending pattern of music content based on a neural network learning;
    training, by the modeling module, the service model using the training data and the result data stored in the customer database for estimating a music age based on the neural network learning;
    obtaining, by the collection module, account information for an account of a user of a service which provides music content, the account information comprising a real biological age of the user of the account, the real biological age registered as personal information;
    obtaining, by the collection module, based on the account information, content information and usability information, the content information comprising one or more properties of music content consumed by the account, and the usability information comprising a manner in which the music content is accessed;
    estimating, by the modeling module, a music age corresponding to the account information, based on the account information, the content information, and the usability information, the music age comprising a virtual age matched with a spending pattern of music content of the user, the music age differing from the real biological age of the user of the account;
    recommending, by the modeling module, additional music content based on the music age rather than the real biological age of the user of the account; and
    causing, by a point of contact (POC) application, a device to play the additional music content instead of music content matching the real biological age of the user of the account;
    wherein estimating, by the modeling module, the music age comprises:
        outputting the spending pattern of music content corresponding to the account information by inputting the account information, the content information, and the usability information into the service model;
        generating a first vector, a second vector, and a third vector from the account information, the content information, and the usability information, respectively;
        generating a customer vector encoding the first vector, the second vector, and the third vector, the first vector encoding account information comprising the real biological age of the user of the account, the second vector encoding content information comprising a property of music content consumed by the account, the third vector encoding usability information comprising a type of POC used to access music content by the account;
        inputting the customer vector to a neural network of the service model;
        outputting, from the neural network, a plurality of probabilities comprising, for each music age candidate of a plurality of music age candidates, a probability that the account information corresponds to the respective music age candidate, the plurality of music age candidates preset according to the spending pattern of music content; and selecting any one music age candidate from among the plurality of music age candidates having a highest probability as the music age corresponding to the account information;

wherein training the service model for estimating the music age based on the neural network learning comprises applying a first weight corresponding to the account information, a second weight corresponding to the content information, and a third weight corresponding to the usability information;

wherein outputting the spending pattern comprises outputting the spending pattern corresponding to the input account information, the content information, and the usability information;

wherein outputting the probabilities comprises outputting probabilities corresponding to the music age candidates corresponding to the spending pattern;

wherein the result data corresponds to a result of recruiting a reference group, for each real age group of a plurality of real age groups, by a certain volume and analyzing spending patterns of users for music content; and wherein the modeling module estimates the music age of all users based on the spending pattern of the reference group.

2. The method of claim 1, wherein at least one of the first vector, the second vector, and the third vector includes a plurality of elements corresponding to a plurality of entities, and wherein the at least one of the first vector, the second vector, and the third vector is generated by determining values of the plurality of elements based on a history previously collected in response to the plurality of entities.

3. The method of claim 1, wherein the estimating of the music age includes:

applying a first weight corresponding to the account information, a second weight corresponding to the content information, and a third weight corresponding to the usability information to each music age candidate of the plurality of music age candidates;

determining probabilities corresponding to each music age candidate of the plurality of music age candidates, based on the first, the second, and the third weights; and estimating the music age corresponding to the account information, based on the probabilities.

4. The method of claim 1, wherein the identifying of the spending pattern includes:

defining one or more time zones for the music content; and identifying the spending pattern for each time zone of the music content based on a time when the music content is consumed, the time being included in the usability information.

5. The method of claim 1, wherein the account information includes at least one of:

personal information stored in the account;

purchase information of a pass through the account; and participation information of a promotion through the account.

6. The method of claim 5, wherein the promotion includes at least one of:

a pass discount event for the music content;

an album release event corresponding to the music content;

a performance event corresponding to the music content; and an affiliate event associated with the music content.

7. The method of claim 1, wherein the properties of the music content include at least one of:

a title of the music content;

a genre of the music content;

an artist of the music content;

a lyric writer of the music content;

a composer of the music content;

a management company of the artist;

a type of the artist;

sound quality of the music content;

popularity of the music content; and a type of the music content.

8. The method of claim 1, wherein the usability information includes at least one of:

a history of using a service menu associated with the music content; and a manner which consumes the music content.

9. The method of claim 8, wherein the type of the POC includes at least one of a mobile dedicated app, a tablet dedicated app, a window dedicated app, a Mac dedicated app, a social network service (SNS) dedicated app, a navigation dedicated app, a vehicle dedicated app, and an artificial intelligence (AI) speaker dedicated app.

10. The method of claim 8, wherein the manner which consumes the music content includes at least one of:

whether to repeatedly set the same music content;

consumption of music content by a recommended playlist; and consumption of music content by a playlist directly edited by a user.

11. The method of claim 8, wherein the manner which consumes the music content includes at least one of:

a 1-day viewing time; and a use time zone.

12. The method of claim 1, wherein the obtaining of the account information includes:

estimating personal information corresponding to the account, based on at least one of whether identity authentication associated with the account is performed and whether there is parental consent associated with the account.

* * * * *